Oct. 24, 1967
K. HEINIMANN ETAL     3,349,294
SOLID ELECTROLYTIC CAPACITOR ENCAPSULATED IN SOLIDIFIED
LIQUID INSULATING MATERIAL
Filed March 30, 1965
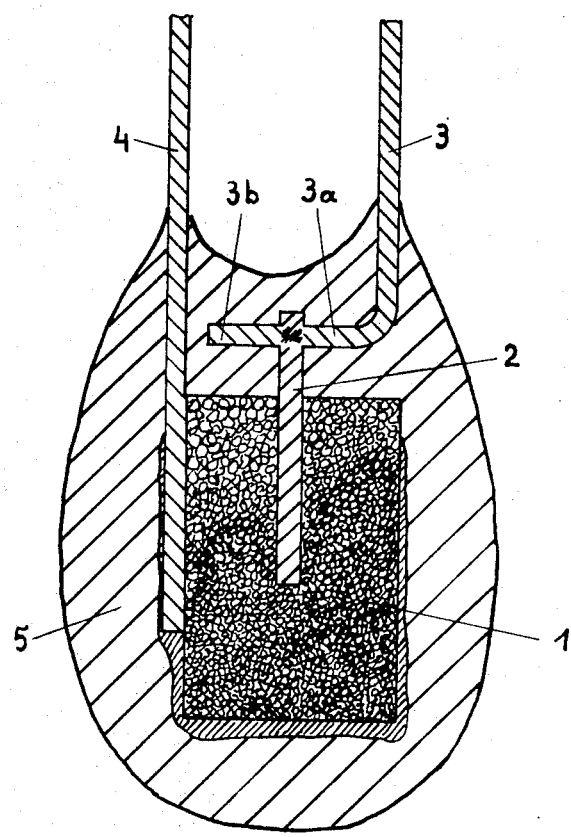
INVENTORS.
KARL HEINIMANN
HELMUT KASSNER
MAXIMILIAN J. SCHMACHTENBERGER
BY
ATTORNEY

United States Patent Office

3,349,294
Patented Oct. 24, 1967

3,349,294
SOLID ELECTROLYTIC CAPACITOR ENCAPSULATED IN SOLIDIFIED LIQUID INSULATING MATERIAL
Karl Heinimann, Nurnberg, Helmut Kassner, Lauf an der Pegnitz, and Maximilian J. Schmachtenberger, Kleinschwarzenlohe, Germany, assignors to International Standard Electric Corporation, New York, N.Y., a corporation of Delaware
Filed Mar. 30, 1965, Ser. No. 443,996
Claims priority, application Germany, Apr. 25, 1964, St 17,222
9 Claims. (Cl. 317—230)

ABSTRACT OF THE DISCLOSURE

This invention provides for a solid electrolyte capacitor which is coated with a liquid insulating material and in which at least one of the lead-out wires comprises a transverse wire construction which tends to retain the liquid insulating material from running out at the lead-in wires.

The present innovation relates to small capacitors, in particular to such ones in which one electrode, i.e. the anode, consists of a sintered body of valve metal which is coated with a dielectric layer or film of oxide. Particularly, the present innovation relates to such capacitors comprising a sintered anode and a solid electrolyte. As such there is arranged, for example, a semiconductor layer on the dielectric oxide film. As lead-in conductor to the semiconductor layer there is used a layer of low-melting metal or a metal alloy which is deposited upon the semiconductor layer e.g. by way of dipping.

Both the sintered body and the semiconductor layer or the layer of solder applied thereto respectively must still be provided with an electric lead-in conductor in the form of a connecting wire (lead-out wire).

It is of a particular advantage to surround such types of capacitors with an insulating compound by way of dipping, with this compound enclosing the capacitor in a moisture-proof manner. This insulating compound which is applied by way of dipping, may consist of several layers and, for identifying the electrical values of the capacitor, may be covered in a suitable way.

Experience has shown that the insulating compound applied by way of dipping, does often not adhere well enough to the capacitor body, especially at those points where the lead-in wires are connected to the capacitor body.

This disadvantage is avoided in the case of the capacitor according to the present innovation.

In the capacitor according to the innovation the connecting wires are in such a way arranged and embodied that the insulating compound adheres well to both the capacitor body and the following-adjacent parts of the connecting wires, thus providing a reliable protection.

The lead-in wires are in such a way attached to the capacitor that they substantially extend parallel in relation to one another in one direction. On account of the wires extending parallel in relation to one another, the sealing compound, especially at those points where the connecting wires are joined to the capacitor, will provide a better adherence.

A further improvement will result when bending the connecting wire rectangularly at its end which is to be joined to the end of the sintered lead-in wire projecting out of the sintered body. This angled-off end of the connecting wire is connected in such a way to the sintered-in lead-out wire of valve metal, that the wires, at the point of contact will constitute an angle of about 90°. Moreover, it is appropriate to attach the angled-off end of the connecting wire not in a butt manner to the lead-in wire of valve metal, e.g. by way of welding, but in such a way that this end will somewhat project over the lead-in (lead-out) wire on the other side. Moreover, it is of advantage to guide the second connecting wire parallel in relation to the first one in such a way that it will pass at a small distance from the angled-off end of the first connecting wire. Of course, the two connecting wires may not touch each other, and the spacing should be so dimensioned that, on one hand, there is provided a sufficient dielectric strength and, on the other hand, the remaining space, with respect to the viscosity of the at first liquid insulating compound, is so narrow that this compound will be retained in this space. If the connecting wires are in such a way mounted to the capacitor, it is possible that the latter, without further ado, and by using the connecting wires as a handle, can be enclosed or encased with an insulating compound by being dipped into a sealing compound, without the sealing compound running away at the lead-out wires thus causing that the capacitor, at those points, is not at all or only insufficiently covered.

For the purpose of further improving the adherence, the connecting wires may be roughened in the manner known to those skilled in the art.

The applied insulating compound may consist of several layers. Each individual layer may have a different color, and layers may partly overlap each other. This may be used for identifying the electrical values of the capacitor.

In the accompanying drawing there is shown one example of embodiment of the present innovation.

The accompanying drawing shows in a sectional elevation a small capacitor surrounded with an insulating compound, on a multiple enlarged scale. The capacitor body 1 consists e.g. of a sintered body of tantalum with a pressed-in lead-in wire 2. This lead-in wire likewise consists of tantalum. The sintered body 1 is coated with a dielectric film of oxide on which there is arranged a semiconductor layer e.g. of manganese dioxide. The connecting wire 3, via the lead-in wire 2, is connected to the sintered body, whereas the connecting wire 4 extending parallel in relation thereto, is connected to the semiconductor layer or the layer of solder metal arranged thereon, respectively. The connecting wire 3 is bent off rectangularly at its lower end (3a), and is in such a way welded to the lead-in wire that a small portion of the angled-off end projects at point 3b. The spacing between the end 3b and the connecting wire 4 is chosen thus, that the layer of insulating material 5 applied by way of dipping, is retained at the top side of the capacitor body and the following connecting wires. This is still supported by the horizontally bent off portion 3a of the connecting wire 3.

The innovation, however, is in no way restricted to the example of embodiment as shown and described herein. The connecting wires may also have any other shape, in other words, they may be bent to the shape of e.g. hairpins or loops, in order to effect a better adherence of the insulating compound.

While we have described above the principles of our invention in connection with specific apparatus, it is to be clearly understood that this description is made by way of example and not as a limitation to the scope of our invention as set forth in the object thereof and in the accompanying claims.

We claim:
1. A capacitor comprising a body including an anode of film forming metal and a dielectric film on the surface of said anode, a solid electrolyte intimately disposed on said dielectric film, first electrical terminal means connected to said anode, second electrical terminal means connected to said electrolyte, an in situ solidified-liquid insulating compound disposed around said electrolyte and encapsulating the anode and portions of the first and second terminal means, at least one of said terminal means including transverse means in side-by-side spaced relation with the other of said terminal means, and with said other terminal means providing means for retaining liquid insulating compound about said terminal means during the in situ solidifying.

2. A capacitor according to claim 1 wherein said first electrical terminal means include a first lead connected to said anode and another lead transverse to said first lead and connected thereto and protruding from said insulating compound.

3. A capacitor according to claim 2 wherein said transverse lead comprises a wire bent at 90°, one side of said wire being connected to said first lead and the other side protruding from said insulating compound.

4. A capacitor according to claim 3 wherein said other side of said bent wire is parallel to said first electrical terminal means.

5. A capacitor according to claim 4 wherein the spacing between said first electrical means and the end of said transverse lead connected to said first anode lead is made as small as possible with respect to the viscosity of the liquid insulating material to retain said liquid insulating material in the space therebetween and around said first and second terminal leads.

6. A capacitor according to claim 1 wherein at least the parts of the connecting elements embedded in the insulating compound, are roughened.

7. A capacitor according to claim 6 wherein said insulating compound is applied by way of dipping.

8. A capacitor according to claim 7 wherein said insulating compound is applied in several layers.

9. A capacitor according to claim 8 wherein said insulating compound consists of several layers of different color which only partly overlap each other.

References Cited

UNITED STATES PATENTS

| | | | |
|---|---|---|---|
| 2,146,029 | 2/1939 | Schimkus | 317—230 X |
| 2,936,514 | 5/1960 | Millard | 317—230 X |
| 3,189,797 | 6/1965 | Okamoto et al. | 317—230 |
| 3,292,053 | 12/1966 | Giacomo | 317—230 |
| 3,292,054 | 12/1966 | Burnhaw et al. | 317—230 |

JAMES D. KALLAM, *Primary Examiner.*